United States Patent
Alberi et al.

(10) Patent No.: US 8,195,984 B2
(45) Date of Patent: Jun. 5, 2012

(54) SYSTEM AND METHOD FOR A STAGGERED EXECUTION ENVIRONMENT

(75) Inventors: James L. Alberi, Holmdel, NJ (US); Marc Pucci, Bridgewater, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 12/787,785

(22) Filed: May 26, 2010

(65) Prior Publication Data

US 2011/0296245 A1    Dec. 1, 2011

(51) Int. Cl.
    *G06F 11/00*    (2006.01)
(52) U.S. Cl. ............ 714/38.1; 714/25; 714/26; 714/31
(58) Field of Classification Search ............ 714/25, 714/26, 31, 38.1
    See application file for complete search history.

(56) References Cited

U.S. PATENT DOCUMENTS

| | | | | |
|---|---|---|---|---|
| 5,581,696 A | * | 12/1996 | Kolawa et al. | 714/38.1 |
| 7,810,081 B2 | * | 10/2010 | Dickenson et al. | 717/140 |
| 7,984,304 B1 | * | 7/2011 | Waldspurger et al. | 713/187 |
| 2008/0313490 A1 | * | 12/2008 | Vageline et al. | 714/3 |

* cited by examiner

*Primary Examiner* — Charles Ehne
(74) *Attorney, Agent, or Firm* — Philip J. Feig

(57) ABSTRACT

A staggered execution environment is provided to safely execute an application program against software failures. In an embodiment, the staggered execution environment includes one or more probe virtual machines that execute various portions of an application program and an execution virtual machine that executes the same application program within a time delay behind the probe virtual machines. A virtualization supervisor coordinates the execution of the application program on one or more probe virtual machines. The probe virtual machines are used to detect and correct software failures prior to the execution virtual machine encountering them. The virtualization supervisor embargos output data in order to ensure that erroneous data is not released which may adversely affect external processes.

6 Claims, 6 Drawing Sheets

SYSTEM AND METHOD FOR A STAGGERED EXECUTION ENVIRONMENT

FIELD OF THE INVENTION

The present invention relates generally to the field of data programming, and more particularly to automated techniques for software failure detection, correction, and security.

BACKGROUND

Software failures in computer programs have been the cause of many computer security problems. Software failures can be caused by arithmetic errors (e.g., division by zero), logic errors (e.g., infinite loops), and resource errors (e.g., access violations), and often cause abnormal program termination or other recognizable behavior. Software failures can also be caused by code-injection attacks. These attacks exploit a memory error in the program which is then used to insert malicious code into the computer program. Typically, such an attack is used to overflow a buffer in the program stack and cause the control of the program to be transferred to the inserted malicious code. The malicious code can be a worm, a Trojan, or a virus. These software failures lead to general disruption of the computing system. Sometimes the software failure affects outputs from the computer program (e.g., external objects, user data files, devices under program control, or data presented on graphical user interfaces) thereby extending the disruption and corruption to other computing systems.

There are some known techniques that have been proposed to recover from such software failures. Some techniques concentrate on recovering from the failure. Other techniques track the input that caused the failure so that the input can be detected at a future time, thereby immunizing the computer program from the software failure in the future. However, these techniques fail to automatically detect and correct the effects of the software failure before any potentially erroneous output is released from the computer program.

SUMMARY

This Summary is provided to introduce a selection of concepts in a simplified form that are further described in the Detailed Description below. This Summary is not intended to identify essential features of the invention or claimed subject matter, nor is it intended to be used in determining the scope of the claimed subject matter.

The present invention pertains to a staggered execution environment (SEE) that has the capability to allow end users to safely execute software programs from unknown or untrusted sources by detecting, protecting and repairing programs near real time, and by limiting the output from such programs until they are deemed safe. In this manner, the output data will not contain erroneous results caused by the software failure and which have the potential to cause additional failures outside of the SEE.

In one embodiment, the SEE can operate within a virtualization environment containing one or more probe virtual machines, an execution virtual machine and a virtualization supervisor. The probe virtual machines execute the application program ahead of a delayed execution of the same application program on the execution virtual machine. Each probe virtual machine can execute a select code segment of the application program. The probe virtual machines are used to detect and correct software failures in the application program before the execution virtual machine encounters the software failures. The probe virtual machines are also used to checkpoint the state of the execution of the program at various time intervals. In the event of a software failure, the probe virtual machine can replay the application program back to a particular checkpoint to determine the cause of the software failure. Upon detection of the software failure, the probe machine uses heuristic rules to correct the software failure and to continue execution of the application program. Alternatively, in the event the probe virtual machine is completely unrecoverable (i.e., destructible failure), that probe virtual machine can be abandoned and another probe virtual machine can be instructed to execute an instruction flow that avoids the instruction path causing the destructible failure.

The virtualization supervisor consists of a scheduler and one or more device coordinators. The scheduler supervises and coordinates the execution of the application program on the probe virtual machines and the execution virtual machine. The scheduler monitors the time delay between the probe virtual machines and the execution virtual machine as well as transfer corrections from detected software failures to the execution virtual machine. There is a device coordinator for each virtual I/O device. The device coordinator contains a stable storage area that is used to store all inputs. The device coordinator also contains several output buffers, each of which are used to embargo the output data.

The execution virtual machine executes an application program within a time delay behind the probe virtual machines. The delay in the execution can be a specified time interval or a specified number of event epochs. The delay is long enough so that if a software failure is detected in a probe virtual machine, it is corrected in the execution virtual machine before the execution virtual machine encounters the software failure or releases erroneous output data.

In another embodiment, the SEE can execute in a shared memory environment. In this embodiment, a shared memory contains all the same software procedures as in the virtualization embodiment, but which are accessed by multiple processors in a computer system.

BRIEF DESCRIPTION OF THE DRAWINGS

The subject matter disclosed is illustrated by way of example, and not by way of limitation, in the figures of the accompanying drawings in which the like reference numerals refer to similar elements and in which.

DETAILED DESCRIPTION

Figure 1:
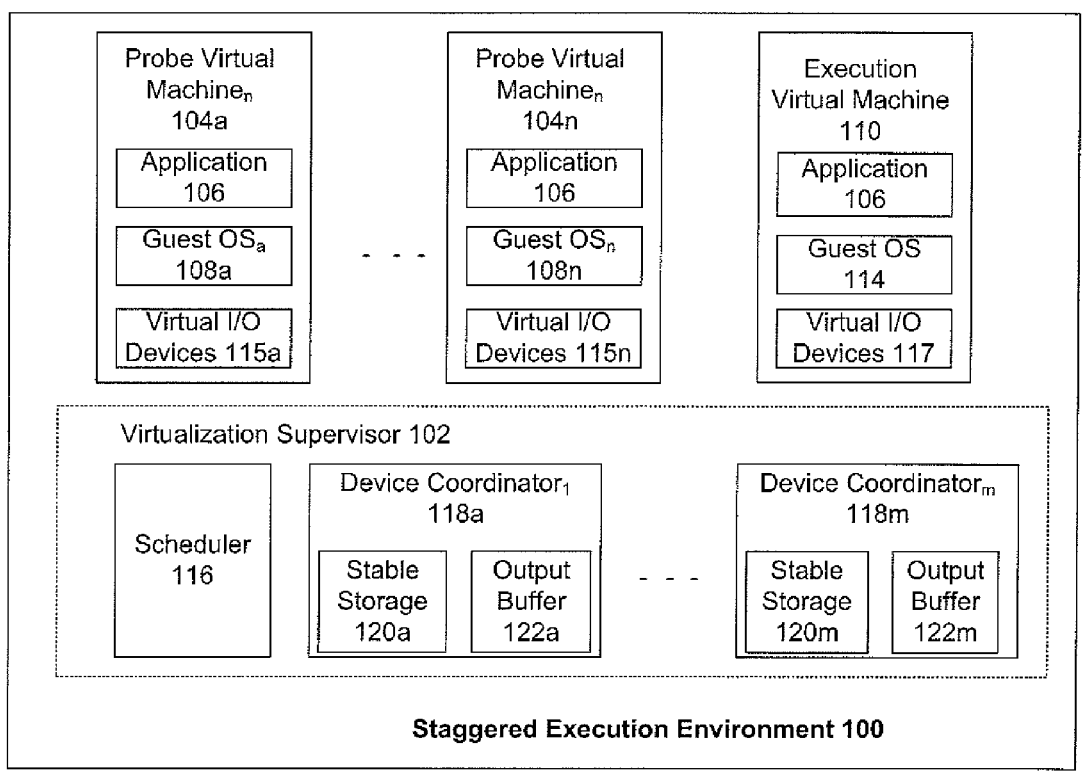
FIG. 1 is a schematic diagram of the staggered execution environment in accordance with an embodiment.

FIG. 1 shows a schematic diagram of an embodiment of the staggered software environment (SEE) 100. The SEE 100 is a virtualized computer made up of various software components. The SEE 100 contains a virtualization supervisor 102 which is a software program that provides a virtual machine environment. The virtualization supervisor 102 is the coordinator or manager of the other virtual machines running in the SEE 100. The virtualization supervisor 102 allows multiple operating systems to run concurrently on a host computer and for these operating systems to share hardware resources, such as I/O devices.

The SEE 100 contains one or more probe virtual machines 104a-104n and at least one execution virtual machine 110. A virtual machine is a software implementation of a computer that executes application programs as a computer. Each probe virtual machine 104a-104n has at least one application program 106 and a guest operating system 108. Each probe virtual machine 104a-104n executes a particular code segment of the application program 106 and logs the state of probe virtual machine at various time intervals or checkpoints.

An execution virtual machine 110 is used to execute the application program 106 within a delayed time interval behind the execution of the same application program 106 on the probe virtual machines 104a-104n. The execution virtual machine 110 can include the application program 106 and a guest operating system 114.

The virtualization supervisor 102 includes a scheduler 116 and one or more device coordinators 118a-118m. The scheduler 116 coordinates and supervises the execution of the probe virtual machines 104a-104n and the execution virtual machine 110. The scheduler 116 initiates, controls, and monitors execution of the application program 106 on the probe virtual machines 104a-104n and execution virtual machine 110. The scheduler 116 ensures that the probe virtual machines 106 run ahead of the execution virtual machine by a particular time interval or epoch event as well as other tasks.

Each device coordinator 118a-118m is associated with a particular virtual I/O device 115a-115n, 117. A virtual I/O device is a virtual representation of an I/O device. The virtual I/O device 115a-115n, 117 receives and transmits I/O to and from a physical I/O device. Examples of virtual I/O devices can be, without limitation, a network interface, disk interface, keyboard, display, etc. Each device coordinator 118a-118m has a stable storage area 120a-120m and an output buffer 122a-122m. The stable storage area 120a-120m is used to store the input events/data and the output buffers 122a-122m store the output events/data before they are released or output from the SEE 100. The stable storage area 120a-120m is designed to survive all failures.

The scheduler 116 interacts with the device coordinators 118a-118m to ensure that input data is stored in the stable storage of an appropriate device coordinator 118a-118m. In addition, the scheduler 116 interacts with the device coordinators 118a-118m to embargo or hold the output data in the output buffers 122a-122m until the scheduler 116 determines when to release the output data.

Figure 2:
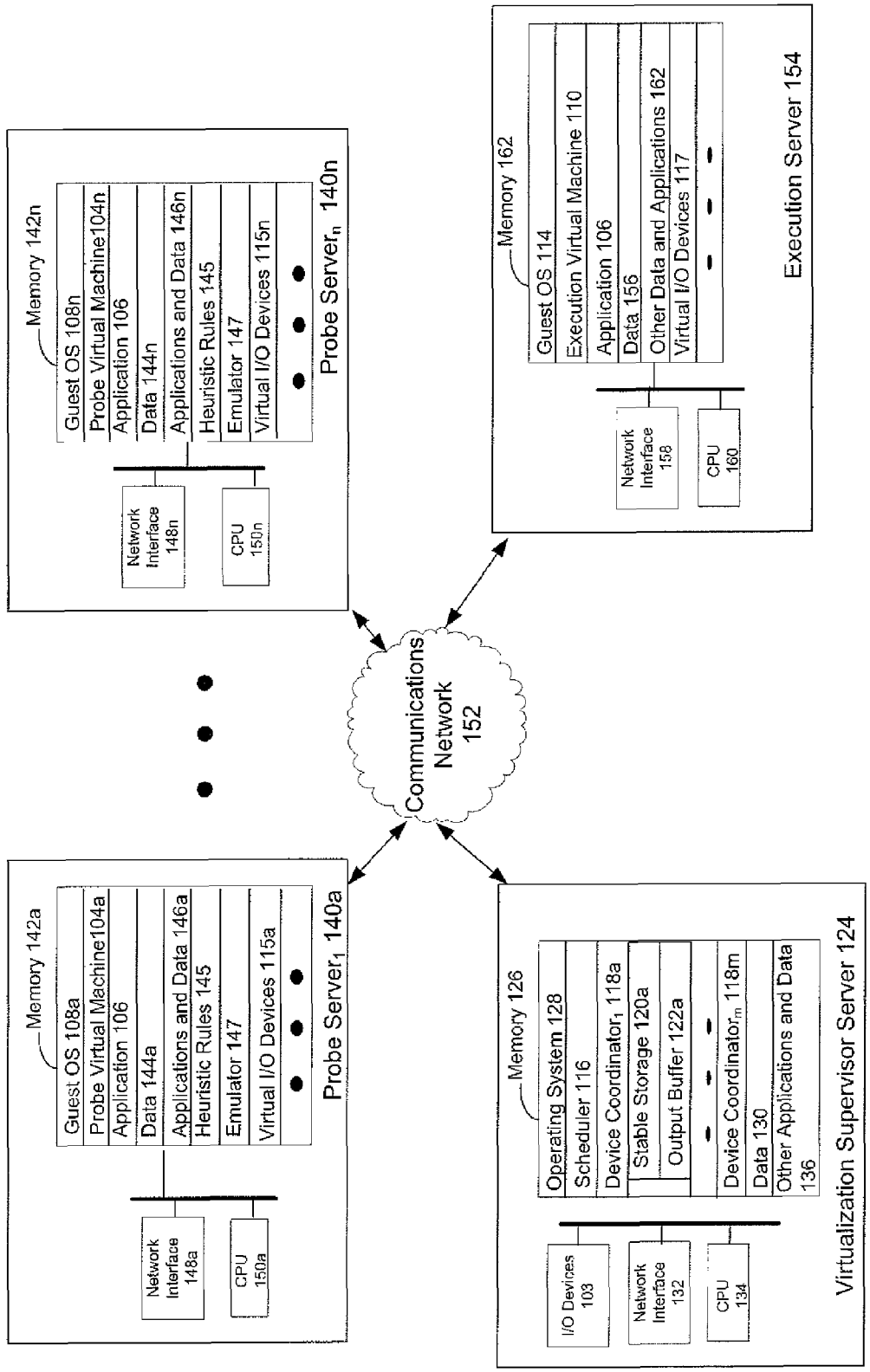
FIG. 2 is a schematic diagram illustrating a configuration of the staggered execution environment on several computers in accordance with an embodiment.

The SEE 100 can be physically implemented on one or more computers or servers in a variety of configurations. FIG. 2 shows a schematic diagram of one embodiment of such a computer configuration for the SEE 100. There is shown a SEE 100 including several servers 140a-140n, 124, 154 in communication with each other through a communications network 152. The servers 140a-140n, 124, 154 can be any type of computing device, such as, without limitation, personal computer, server, laptop, PDA, cell phone, and the like. The communications network 152 can be any type of network capable of facilitating communication between the servers 140a-140n, 124, 154.

The virtualization supervisor server 124 has, at a minimum, a network interface 132 for facilitating network communication, a memory 126, a processor or CPU 134, and one or more physical I/O devices 103. The memory 126 can be a computer readable medium that can store executable procedures, applications, and data. It can be any type of memory device (e.g., random access memory, read-only memory, etc.), magnetic storage, volatile storage, non-volatile storage, optical storage, DVD, CD, and the like. The memory 126 can also include one or more external storage devices or remotely located storage devices. The memory 126 can contain instructions and data as follows:

- an operating system 128;
- a scheduler 116;
- one or more device coordinators 118a-118m where each device coordinator 118 has stable storage 120a and an output buffer 122a; and
- data 130 used by the scheduler 116 and device coordinators 118a-118m; and
- other applications and data 136.

Each probe server 140a-140n has, at a minimum, a network interface 148a-148n for facilitating network communication, a memory 142a-142n, and a processor or CPU 150a-150n. The memory 142a-142n can be a computer readable medium that can store executable procedures, applications, and data. It can be any type of memory device (e.g., random access memory, read-only memory, etc.), magnetic storage, volatile storage, non-volatile storage, optical storage, DVD, CD, and the like. The memory 142a-142n can also include one or more external storage devices or remotely located storage devices. The memory 142a-142n can contain instructions and data as follows:

- a guest operating system 108a-108n;
- a probe virtual machine 104a-104n;
- an application program 106;
- data 144a-144n used by the probe virtual machine 104a-104n;
- other applications and data 146a-146n;
- heuristic rules 145 used to determine the source of software failures and applicable corrections;
- an emulator 147 used to test the corrections; and
- one or more virtual I/O devices 115a-115n.

The execution server 154 has, at a minimum, a network interface 158 for facilitating network communication, a memory 162, and a processor or CPU 160. The memory 162 can be a computer readable medium that can store executable procedures, applications, and data. It can be any type of memory device (e.g., random access memory, read-only memory, etc.), magnetic storage, volatile storage, non-volatile storage, optical storage, DVD, CD, and the like. The memory 162 can also include one or more external storage devices or remotely located storage devices. The memory 162 can contain instructions and data as follows:

- a guest operating system 114;
- an execution virtual machine 110;
- an application program 106;
- data 156;
- other applications and data 162; and
- virtual I/O devices 117.

Although FIG. 2 shows one such configuration, it should be noted that the SEE 100 can accommodate any configuration. For example, the virtualization supervisor 102, the probe virtual machines 104a-104n and the execution virtual machine 100 can be executing on the same server. Alternatively, the SEE 100 can be configured such that the virtualization supervisor 102 is on one server and the probe 104a-104n and execution virtual machine 100 are all executing on a second server. Furthermore, the SEE 100 can be configured to operate in a shared memory environment. In this embodiment, the probe virtual machines 104a-104n, the execution virtual machine 110, the scheduler 116, and the device coordinators 118a-118m execute in a single shared memory that is accessible by multiple processors or computers. In this embodiment, there would not be any virtualization or virtual machines rather software programs executing from a shared memory.

Attention now turns to a more detailed description of the processes within the SEE 100.

The SEE 100 operates as a message-passing system where each of the processes in the SEE communicate with each other through messages. A process is a single instance of a computer program whose instructions are executed sequentially on a computer capable of executing several computer programs concurrently. In an embodiment of the SEE 100, the virtualization supervisor 102, each of the probe virtual machines 104, and the execution virtual machine 110 can be considered a process. Each process interacts with the other processes within the SEE 100 and with other processes outside of the SEE 100 by receiving input messages and by transmitting output messages.

Execution of the application program 106 is viewed as a sequence of state intervals. Each state interval is initiated by a input event, such as receiving an interrupt or receiving inputs (e.g., keyboard input, input message, etc.). Execution within the state interval is deterministic and each process starts from the same state and encounters the same input events at the same location within the execution.

As a process executes, the process logs the data descriptors of all input events that it observes onto stable storage 120. A data descriptor uniquely identifies a particular input event and contains all information necessary to replay the input event during recovery. Each process also takes checkpoints at predefined intervals to save the execution state of the process at a particular point in time. The checkpoint data is also stored in stable storage 120.

When a software failure occurs, the failed process recovers by using the checkpoints and logged data descriptors to replay the corresponding nondeterministic events precisely as they occurred during the pre-failure execution. The process is rolled back to the prior checkpoint, replays the deliveries of the messages in their original order to reach the next input event whose data descriptor is not logged. At that point, the process uses a set of heuristic rules to determine the cause of the software failure and to apply the needed correction. The corrected code is then tested through the use of an emulator 147. Once the correction is successful, the execution virtual machine 110 uses the correction in its execution of the application program 106.

The scheduler 116 can either replay the failed process on the probe virtual machine 104 detecting the software failure or alternatively, replay the failed process on another probe virtual machine 104.

When a failure occurs, the outside world cannot be relied on to roll back. For this reason, before a message is sent to the outside world, the scheduler 116 embargoes all outputs until sufficient time has passed to ensure that a future software failure will not affect the output.

Figure 3:
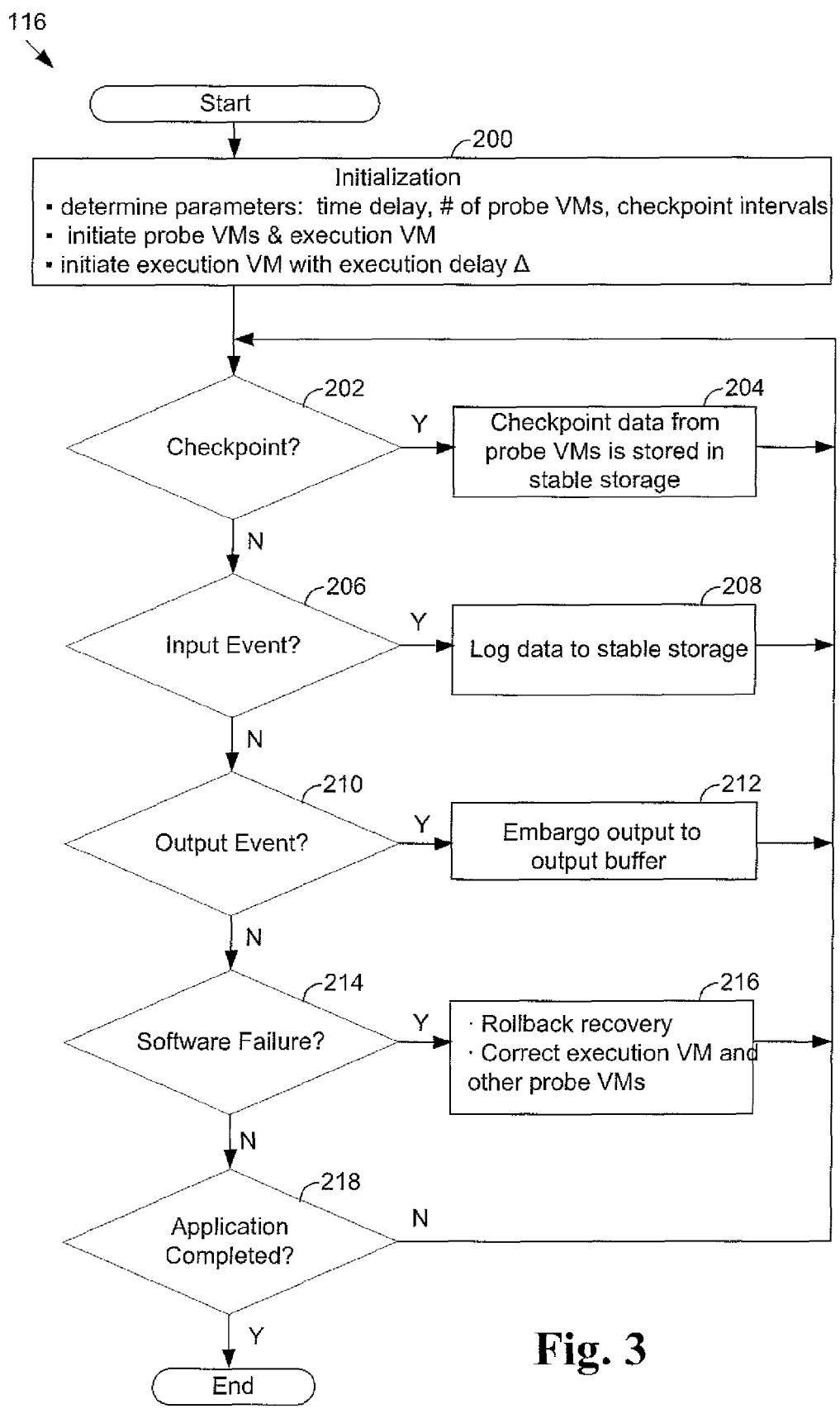
FIG. 3 is a flow chart illustrating the steps used by the scheduler in accordance with an embodiment.

These activities are supervised and controlled by the scheduler 116. Turning to FIG. 3, there is shown the steps used by the scheduler 116 in coordinating the execution of the application program 106 in the SEE 100. In one embodiment, the scheduler 116 runs in a separate machine from the probe virtual machines 104 so that software failures do not affect the operating system 128 of the virtualization supervisor 102 or other processes running in the virtualization supervisor 102. However, in other embodiments, the scheduler 116 can run in a separate domain so that it is protected from possible security breaches resulting from the software failure. This is to prevent disruption to the scheduler 116 in the event of a malicious code attack.

The scheduler 116 initially sets up the execution environment for the application program 106 to run (step 200). Certain parameters are determined at the outset, such as the time delay, the number of probe virtual machines 104 and the checkpoint intervals. These parameters can be user-defined or set in accordance with a predetermined heuristic based on program information. The time delay is the amount of time the execution virtual machine 110 lags behind executing the same application program 106 on the probe virtual machines 104. The checkpoint interval is the point in time when the execution state is saved to stable storage 120. This checkpoint interval can be a predetermined time interval that is a function of the size of the application program 106. Alternatively, the checkpoint interval can be an epoch event.

Once these parameters are determined, the scheduler 116 initiates execution of the application program 106 on one or more probe virtual machines 104 (step 200). The scheduler 116 also initiates the execution virtual machine 110 to run the application program 106. The scheduler 116 ensures that the time delay between the probe and execution virtual machines is continuously maintained.

The application program 106 can be partitioned into code segments. The scheduler 116 can initiate execution of one code segment on one probe virtual machine 104 and other code segments on other probe virtual machines 104. The scheduler 116 coordinates execution of the various code segments on the different probe virtual machines 104.

At a checkpoint interval (step 202-Y), the scheduler 116 coordinates with the probe virtual machines 104 so that the execution state of the probe virtual machine 104 is saved in stable storage 120. The state of the probe virtual machine 104 is a complete copy of the virtual machine including, without limitation, the CPU registers, the physical memory, the virtual disk, the state of the guest operating system, etc. In an embodiment, the scheduler 116 performs coordinated checkpointing where all the processes coordinate their checkpoints in order to save a system-wide consistent state.

There are many known techniques for implementing checkpoints. In one embodiment, the SEE 100 can utilize a log-based protocol that combines checkpointing with logging of input events represented as data descriptors. Logging is used to store the interactions of the application program 106 with input and output devices, events that occur to each process, and messages that are exchanged between the processes.

All input events, such as interrupts, receiving messages, and inputs, can be identified and their corresponding data descriptors are logged or stored to stable storage 120. During failure-free operation, each process logs the data descriptors of all input events that it observes onto stable storage 120. The data descriptor contains all information necessary to replay the event should it be necessary during recovery. Each process takes checkpoints to reduce the extent of rollback during recovery. After a failure occurs, the failed processes recover by using the checkpoints and logged data descriptors to replay the corresponding nondeterministic events precisely as they occurred during the pre-failure execution.

Alternatively, incremental checkpointing can be used which includes memory undo and redo logs. The checkpoints are made at certain predetermined time intervals. A copy-on-write and versioning technique can be used to save only those pages that have been modified since the last checkpoint. Checkpoints of the memory pages are represented as memory undo and redo logs. The memory undo log at a particular checkpoint n contains the set of memory pages that have been modified between the previous checkpoint n−1 and the next checkpoint, n+1. The memory undo log allows the program to move back in time to a previous checkpoint. The memory redo log is used to allow the program to move forward in time to a future checkpoint. The memory redo log at checkpoint n includes the memory pages that have been altered between checkpoint n−1 and checkpoint n.

When it is not time to take a checkpoint (step 202-N), the scheduler 116 determines whether a probe virtual machine 104 has received an input event (step 206). In the event that one of the probe virtual machines 104 encounters an input event (step 206-Y), the scheduler 116 ensures that the input event is logged in the associated stable storage 120 (step 208). An input event is an event that is not predetermined, such as without limitation, network input, interrupts, user input, receiving messages, interleaving of multiple threads, etc. The scheduler 116 gives the input event a data descriptor which uniquely identifies the event. The input event is then stored in the stable storage 120 associated with a device coordinator 118 corresponding to an associated virtual I/O device.

If an input event has not occurred (step 206-N), the scheduler 116 determines if a probe virtual machine 104 is ready to output data (step 210). The output data can be any type of output object, such as without limitation, external objects, user data files, devices under program control, or data presented on graphical user interfaces. The output data is stored in the output buffer 122 corresponding to the device coordinator 118 for the associated output device. The scheduler 116 will notify the device coordinator 118 when to release the output data.

If there is no pending output event (step 210-N), the scheduler 116 determines if a software failure has occurred (step 214). If a software failure occurs during execution of one of the probe virtual machines 104 (step 214-Y), then the scheduler 116 ensures that the probe virtual machine 104 recovers by reconstructing the pre-failure execution up to the first input event whose data descriptor is not logged. The probe virtual machine 104 will use the checkpoints and logged data descriptors to replay the input events as they occurred during the pre-failure execution. Depending on the type of software failure, the scheduler 116 will assist in either getting the probe virtual machine 104 the needed checkpoints and logged data descriptors to recovery to the pre-failure execution state interval (step 216). The scheduler 116 will supervise the execution of the probe virtual machine 104 in executing the application program 106 instruction-by-instruction. The probe virtual machine 104 uses a set of heuristic rules to determine the cause of the software failure. A correction is applied and the correction is then emulated by a probe virtual machine 104. When the correction is successfully tested, the scheduler 116 notifies the other probe virtual machines 104 and the execution virtual machine 110 of the correction (step 216). The correction is applied and the processes continue their control flow (step 216).

Alternatively, the scheduler 116 can utilize another probe virtual machine 104 to replay the state of the failed probe virtual machine. This test probe virtual machine would receive the checkpoints and logs of the failed probe virtual machine up to the point of the software failure. The test probe virtual machine would determine the source of the software failure and use the heuristic rules 145 to determine a possible correction. The correction would be emulated in the test probe virtual machine. The scheduler 116 would be notified of the correction which would be applied to the execution virtual machine 110.

If there are no software failures (step 214-N), the scheduler 116 determines if the application program has completed (step 218). If the application program 106 is completed (step 218-Y), then the scheduler process is completed until another application program is executed in the SEE 100. Otherwise (step 218-N), the scheduler 116 continues to monitor for activities requiring its attention.

Figure 4:
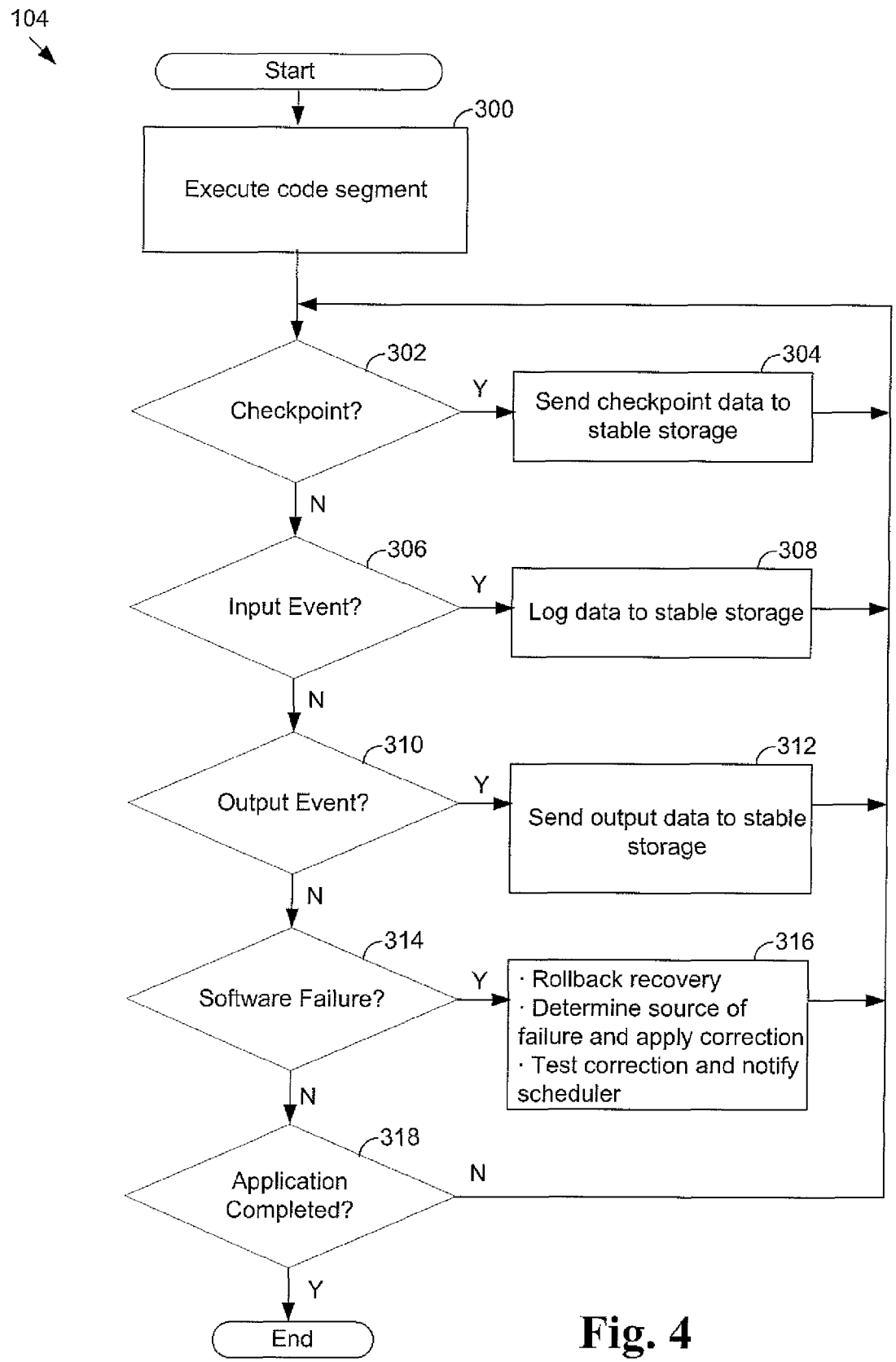
FIG. 4 is a flow chart illustrating the steps used by a probe virtual machine in accordance with an embodiment.

FIG. 4 illustrates the steps used by the probe virtual machine 104 in the execution of the application program 106 in the SEE 100. Initially, the probe virtual machine 104 will receive instructions from the scheduler 116 that will indicate which code segment in the application program 106 the probe virtual machine 104 is to execute (step 300). The scheduler 116 can use one or more probe virtual machines 104 to execute the application program 106. The application program 106 can be partitioned into various code segments, each of which can be executed by a particular probe virtual machine 104. At various points in the execution of this code segment, the probe virtual machine 104 will receive instructions, in the form of messages, instructing the probe virtual machine 104 to perform certain tasks.

At predetermined time intervals or checkpoints (step 302-Y), the probe virtual machine 104 will send its execution state to stable storage 120 in a select one of the device coordinators 118 (step 304). If the probe virtual machine 104 receives an input event (step 306), the input event is logged or stored into the stable storage 120 associated with the device coordinator 118 corresponding to the virtual I/O device 115a-115n receiving the input event (step 308). If there is output to be released from the SEE 100 (step 310), the output data is stored into the stable storage 120 associated with the device coordinator 118 corresponding to the virtual I/O device that will transmit the output data (step 312). In the event of a software failure (step 314), the probe virtual machine 104 will perform a rollback recovery using the checkpoint and logged data to the checkpoint prior to the software failure (step 316). The probe virtual machine 104 will use the heuristic rules to determine the source of the software failure and to apply a correction (step 316). The corrected code segment is tested by executing the corrected code segment through an emulator 147 (step 316). The scheduler 116 is then notified of the correction (step 316).

Figure 5:
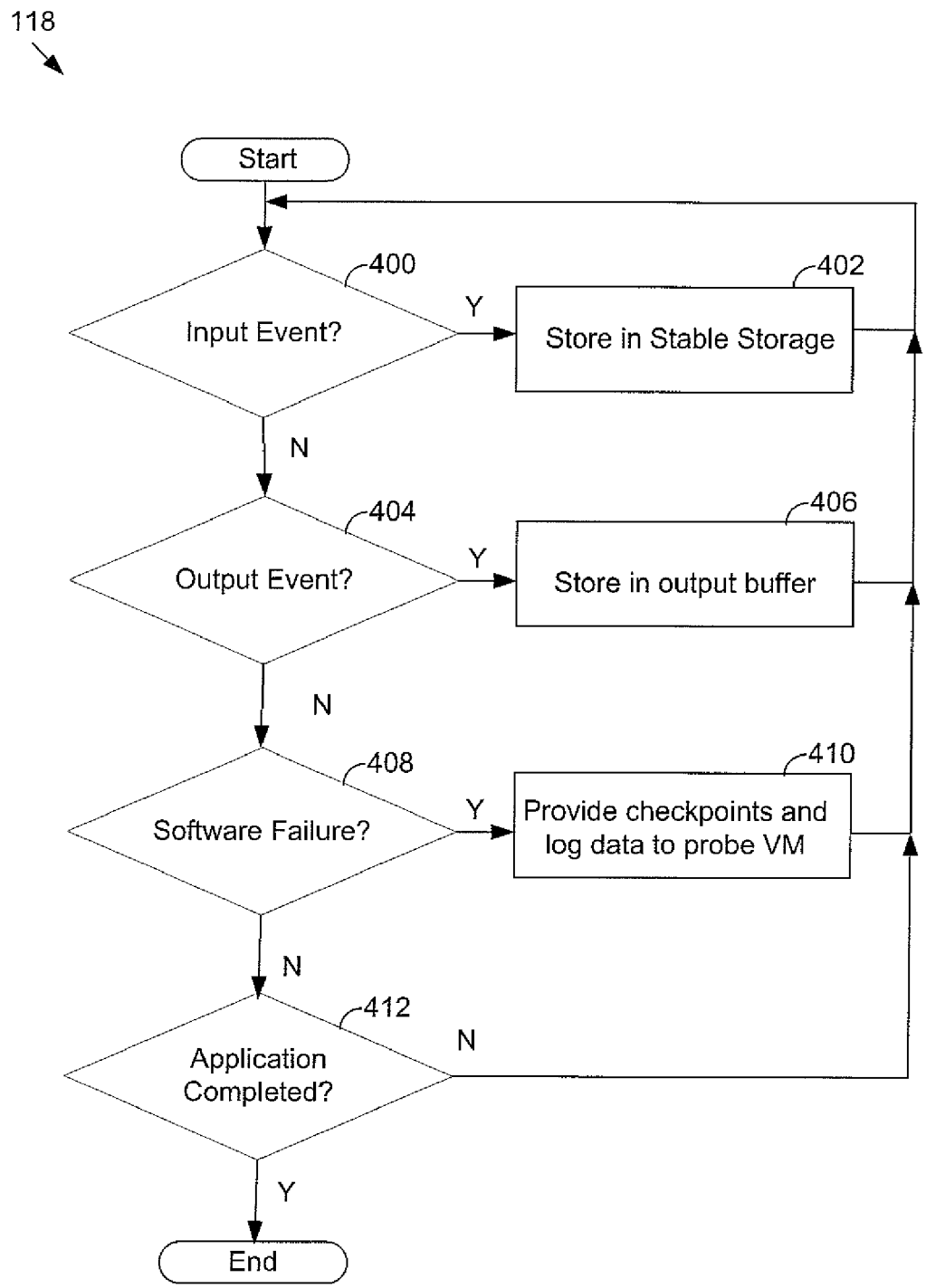
FIG. 5 is a flow chart illustrating the steps used by a device coordinator in accordance with an embodiment.

FIG. 5 illustrates the steps used by each device coordinator 118 to manage and control its corresponding virtual I/O device 115a-115n. Each device coordinator 118 has a stable storage area 120 used to store input events received by the virtual I/O device. In addition, a select one of the device coordinators 118 is used to store the checkpoint data. In the event the virtual I/O device receives an input event (step 400-Y), a corresponding data descriptor is created and stored in stable storage 120 (step 402). In the event output data is to be transmitted from the virtual I/O device (step 404), the output data is stored in the output buffer 122 until it is appropriate to release the output data (step 406). In the event a software failure is detected (step 408-Y), checkpoint and log data is provided to the affected probe virtual machine 104 for its use in performing rollback recovery (step 410). When the application program 106 completes execution (step 412-Y), the process ends. Otherwise, the process continues execution of the application program 106 and interacts with the other processes in the SEE 100 (step 412-N).

Figure 6:
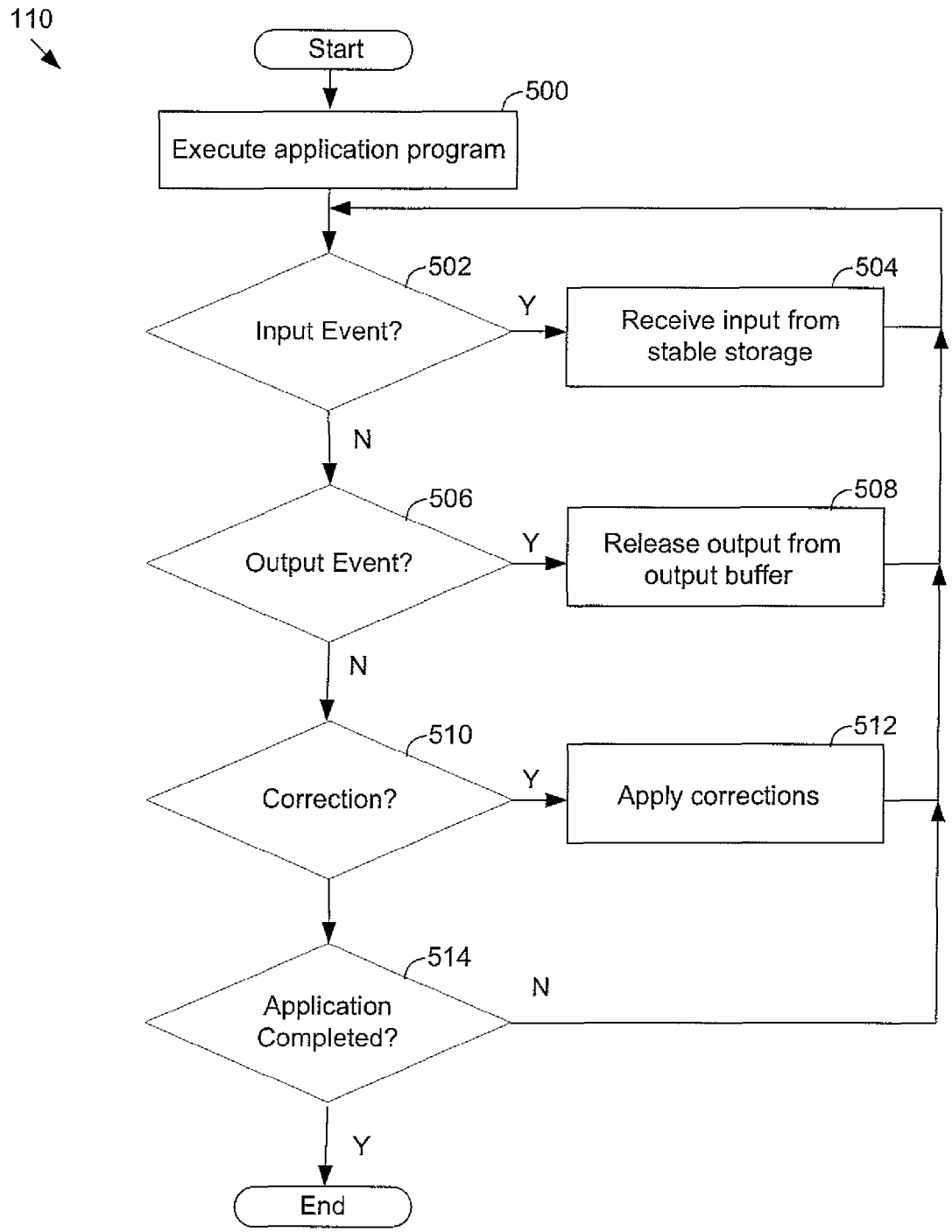
FIG. 6 is a flow chart illustrating the steps used by the execution virtual machine in accordance with an embodiment.

FIG. 6 illustrates the steps used by the execution virtual machine 110 in the SEE 100. Initially, the execution virtual machine 110 is configured to execute the application program 106 within a delayed time interval behind the probe virtual machines 104 (step 500). If the application program 106 receives an input event (step 502), the data is provided to the execution virtual machine 110 from stable storage 120 (step 504). If output data is to be released from the application program 106 (step 506-Y), the output data is released from the corresponding output buffer 122 (step 508). If corrections are forwarded to the execution virtual machine 110 (step 510-Y), the execution virtual machine 110 applies them to the application program 106 (step 512).

The foregoing description, for purposes of explanation, has been described with reference to specific embodiments. However, the illustrative teachings above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It should be noted that several of the software components of the SEE, such as the probe virtual machines and the execution virtual machines, are software programs although they are referred to herein as machines. In addition, although the probe virtual machines and the execution virtual machines are referred to herein as virtual machines, this term also refers to the embodiments where these programs are used without any virtualization. Furthermore the terms probe virtual machine and probe machine are used interchangeably as well as execution virtual machine and execution machine.

What is claimed is:

1. A system for executing an application program, comprising:
    an execution machine configured to execute one or more code segments of the application program;
    a first probe machine configured to execute one or more code segments of the application program;
    a scheduler that coordinates execution of the code segments on the execution machine and execution of the code segments on the first probe machine, wherein execution of a code segment on the execution machine is within a predetermined time interval behind execution of same code segment on the first probe machine;
    wherein the first probe machine is configured to detect a software failure in a failed code segment, to determine a correction for the software failure, and to notify the scheduler of the correction; and
    wherein the scheduler applies the correction to the execution machine prior to the execution machine executing the code segment experiencing the software failure and arranges for checkpoints of the first probe machine to be saved at predefined time intervals;
    further comprising:
    a second probe machine configured to recover the first probe machine at a checkpoint prior to the software failure and to detect and correct the software failure.

2. A method for executing an application program, comprising:
    executing a code segment of the application program on a first probe machine;
    executing the code segment on an execution machine within a time interval after execution of the code segment on the first probe machine;
    detecting a software failure in the code segment executing on the first probe machine;
    determining a correction to the software failure in the code segment executing on the first probe machine;
    checkpointing the first probe machine at predetermined intervals;
    logging all input events received by the first probe machine; and
    applying the correction to the code segment executing on the execution machine,
    wherein the determining step comprises:
    rolling back the first probe machine to a checkpoint prior to the software failure; and
    tracing execution of the code segment from the checkpoint using the logged input events.

3. The method of claim 2, further comprising:
    using heuristic rules to determine the correction for the software failure; and
    testing the correction.

4. A method for executing an application program, comprising:
    executing a code segment of the application program on a first probe machine;
    executing the code segment on an execution machine within a time interval after execution of the code segment on the first probe machine;
    detecting a software failure in the code segment executing on the first probe machine;
    determining a correction to the software failure in the code segment executing on the first probe machine;
    checkpointing the first probe machine at predetermined intervals;
    logging all input events received by the first probe machine; and
    applying the correction to the code segment executing on the execution machine,
    wherein the determining step comprises:
    rolling back the state of execution of the code segment experiencing the software failure on a second probe machine to a checkpoint prior to the software failure.

5. A method for executing an application program, comprising:
    executing a code segment of the application program on a first probe machine;
    executing the code segment on an execution machine within a time interval after execution of the code segment on the first probe machine;
    detecting a software failure in the code segment executing on the first probe machine;
    determining a correction to the software failure in the code segment executing on the first probe machine;
    applying the correction to the code segment executing on the execution machine;
    further comprising:
    embargoing output data released from execution of the application program on the probe machine; and
    releasing the output data from execution of the application program on the execution machine.

6. A computer program product having a computer readable storage medium comprising:
    a virtualization supervisor configured to create a machine environment to execute an application program on at least one probe machine and an execution machine, wherein the execution machine executes the application within a time interval behind the probe machine; and
    a device coordinator to receive input events destined as inputs to the application program and to transmit outputs released from the application program, wherein the device coordinator receives checkpoints from the probe machine at select time intervals and wherein the virtualization supervisor instructs a second probe machine to roll back to a checkpoint prior to the software failure so that the second probe machine can detect a source of the software failure.

* * * * *

UNITED STATES PATENT AND TRADEMARK OFFICE
CERTIFICATE OF CORRECTION

| | | |
|---|---|---|
| PATENT NO. | : 8,195,984 B2 | Page 1 of 1 |
| APPLICATION NO. | : 12/787785 | |
| DATED | : June 5, 2012 | |
| INVENTOR(S) | : Alberi et al. | |

It is certified that error appears in the above-identified patent and that said Letters Patent is hereby corrected as shown below:

In the Specification

In Column 2, Line 64, delete "staggered software environment (SEE) 100." and insert -- staggered execution environment (SEE) 100. --, therefor.

In Column 3, Lines 30-31, delete "virtual machines 106" and insert -- virtual machines 104a-104n --, therefor.

In Column 4, Lines 60-61, delete "execution virtual machines 100" and insert -- execution virtual machines 110 --, therefor.

In Column 4, Line 64, delete "execution virtual machines 100" and insert -- execution virtual machines 110 --, therefor.

In Column 5, Line 23, delete "a input" and insert -- an input --, therefor.

In Column 8, Lines 35-36, delete "deter mine" and insert -- determine --, therefor.

Signed and Sealed this
Eighteenth Day of November, 2014

Michelle K. Lee
*Deputy Director of the United States Patent and Trademark Office*